US011538028B1

(12) United States Patent
Dulub

(10) Patent No.: US 11,538,028 B1
(45) Date of Patent: Dec. 27, 2022

(54) IMPLEMENTING NON-FUNGIBLE TOKENS USING BITCOIN

(71) Applicant: Alexei Dulub, Dubai (AE)

(72) Inventor: Alexei Dulub, Dubai (AE)

( * ) Notice: Subject to any disclaimer, the term of this patent is extended or adjusted under 35 U.S.C. 154(b) by 0 days.

(21) Appl. No.: 17/846,450

(22) Filed: Jun. 22, 2022

(51) Int. Cl.
```
G06Q 20/36      (2012.01)
H04L 9/00       (2022.01)
G06Q 20/40      (2012.01)
H04L 9/32       (2006.01)
```

(52) U.S. Cl.
CPC ..... *G06Q 20/3678* (2013.01); *G06Q 20/3674* (2013.01); *G06Q 20/401* (2013.01); *H04L 9/3213* (2013.01); *H04L 9/3236* (2013.01); *H04L 9/50* (2022.05); *G06Q 2220/00* (2013.01); *H04L 2209/56* (2013.01); *H04L 2209/60* (2013.01)

(58) Field of Classification Search
CPC ........... G06Q 20/3678; G06Q 20/3674; G06Q 20/401; G06Q 2220/00; H04L 9/3213; H04L 9/3236; H04L 9/50; H04L 2209/56; H04L 2209/60

See application file for complete search history.

(56) References Cited

U.S. PATENT DOCUMENTS

| | | | | |
|---|---|---|---|---|
| 11,348,152 B1* | 5/2022 | Davis | ................. | G06Q 30/0609 |
| 11,367,060 B1* | 6/2022 | Barbashin | .......... | H04N 21/8352 |
| 2016/0323109 A1* | 11/2016 | McCoy | ................ | G06Q 50/184 |
| 2017/0236121 A1* | 8/2017 | Lyons | ................ | G06Q 20/3829 705/71 |
| 2017/0324711 A1* | 11/2017 | Feeney | ............... | H04L 63/0428 |
| 2021/0409489 A1* | 12/2021 | Speasl | .................. | H04L 67/108 |
| 2022/0101316 A1* | 3/2022 | Cramer | ............. | G06Q 20/3825 |

FOREIGN PATENT DOCUMENTS

| | | | | | |
|---|---|---|---|---|---|
| CN | 113988857 | A | * | 1/2022 | |
| CN | 114358948 | A | * | 4/2022 | |
| GB | 2572627 | A | * | 10/2019 | ............. G06Q 20/02 |
| GB | 2587354 | A | * | 3/2021 | ............. G06Q 20/02 |
| WO | WO-2019111125 | A1 | * | 6/2019 | ........... H04L 9/0637 |
| WO | WO-2022022928 | A1 | * | 2/2022 | ........... G06Q 40/123 |

OTHER PUBLICATIONS

Jeff Herbert, A Novel Method for Decentralised Peer-to-Peer Software License Validation Using Cryptocurrency Blockchain Technology, Jan. 2015, ACSC (Year: 2015).*

* cited by examiner

*Primary Examiner* — Neha Patel
*Assistant Examiner* — Chunling Ding
(74) *Attorney, Agent, or Firm* — Bardmesser Law Group

(57) ABSTRACT

A novel method and instruction set for storing and trading Non-Fungible Tokens (NFTs), on Bitcoin blockchain. As proof of NFT ownership, proposed methods allow a user to perform the following operations with an NFT: (1) store NFT token on Bitcoin blockchain; (2) securely associate NFT data unit with digital assets (photos, video, audio, digital documents, etc.); (3) grouping many NFT tokens together to a collection with a single unique identifier; (4) safely sell and buy an NFT using Bitcoin ecosystem. These actions and validation of the transactions are performed using Bitcoin transactions.

21 Claims, 5 Drawing Sheets

IMPLEMENTING NON-FUNGIBLE TOKENS USING BITCOIN

FIELD OF THE INVENTION

This invention relates to crypto assets, and, more particularly, to implementing Non-Fungible Tokens (NFTs) using the Bitcoin ecosystem.

BACKGROUND OF THE RELATED ART

The volume of transactions in different blockchain solutions with NFTs is increasing daily. The most popular NFT standard is ERC-721 [1], which represents non-fungible digital assets based on the Ethereum blockchain.

Usage of the Ethereum for NFT appears to be natural due to its versatile Smart Contracts. This feature allows to facilitate exchange of virtually any class of assets, which is capable to transfer within the Internet infrastructure. But, in other cases is more preferable to use other blockchain solutions, e.g., Bitcoin, for NFT issuing and execution of manipulation instructions with the NFT. This may be, for example, because there are lower transaction fee compared to Etherium [2], which many users prefer.

By default, Bitcoin ecosystem does not allow exchange of any object other than Bitcoin unit. Also, Bitcoin Script language [4] provides less functionality comparing with Ethereum Smart Contracts. However, Bitcoin Script language allows to store a small amount of metadata on the blockchain, which can be used to represent NFT asset manipulation instruction by defining metadata structure per instruction. Usage of the metadata allows to define NFT protocol over Bitcoin blockchain, which provides proof of ownership and required functionality for NFT issuing and transferring.

SUMMARY OF THE INVENTION

The proposed NFT over Bitcoin protocol is a Colored Coin [3] implementation based on the OP_RETURN Bitcoin Script opcode. The metadata in OP_RETURN is used for storing a reference to a digital asset on the Bitcoin and representing asset manipulation. According to the protocol rules described below, the metadata is bound to one or more standard Unspent Transaction Output (UTXO) [18], where the UTXO is used for an asset issuing and transferring. Strict definition of OP_RETURN metadata structure allows to achieve consensus for the protocol users. Denoting a Bitcoin transaction satisfies the protocol rules as Protocol Related transaction (PRTX). The type of a PRTX is defined by a content of metadata followed by OP_RETURN opcode. The protocol admits four PRTX types: GENESIS COLLECTION, COLLECTION MINT, GENESIS NFT and NFT SEND. A PRTX with specific type is used for specific purpose described below.

Consensus for the protocol users regarding this is possible by backward iteration among Bitcoin, transactions using corresponding UTXO, starting from the given Bitcoin transaction up to GENESIS COLLECTION PRTX with verification on each step the protocol requirements described below.

In one aspect, there is provided a method of implementing Non-Fungible Tokens (NFTs) using Bitcoin, the method including creating a set of metadata describing a collection of NFTs; loading the metadata into a Content Addressable Storage (CAS) [17]; receiving a first cryptographic hash representing an address of the set of the metadata in the CAS generating a GENESIS COLLECTION transaction that includes the first cryptographic hash and a first UTXO, wherein the first UTXO is associated with metadata of the GENESIS COLLECTION; sending the GENESIS COLLECTION transaction to a Bitcoin blockchain; generating a COLLECTION MINT transaction that includes multiple UTXOs created spending the first UTXO; defining a digital asset to be associated with an NFT from the collection of NFTs; loading the digital asset into a CAS; receiving a second cryptographic hash representing an address of the digital asset in the CAS; using one of the multiple UTXOs from COLLECTION MINT, generating a GENESIS NFT transaction that includes the second cryptographic hash; and sending the GENESIS NFT transaction to the Bitcoin blockchain. Changing an owner of an NFT is possible by generating the NFT SEND transaction, where bounded UTXO of current GENESIS NFT or NFT SEND PRTX is spent to a Bitcoin address of a new owner.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and, together with the description, serve to explain the principles of the invention.

Figure 3:
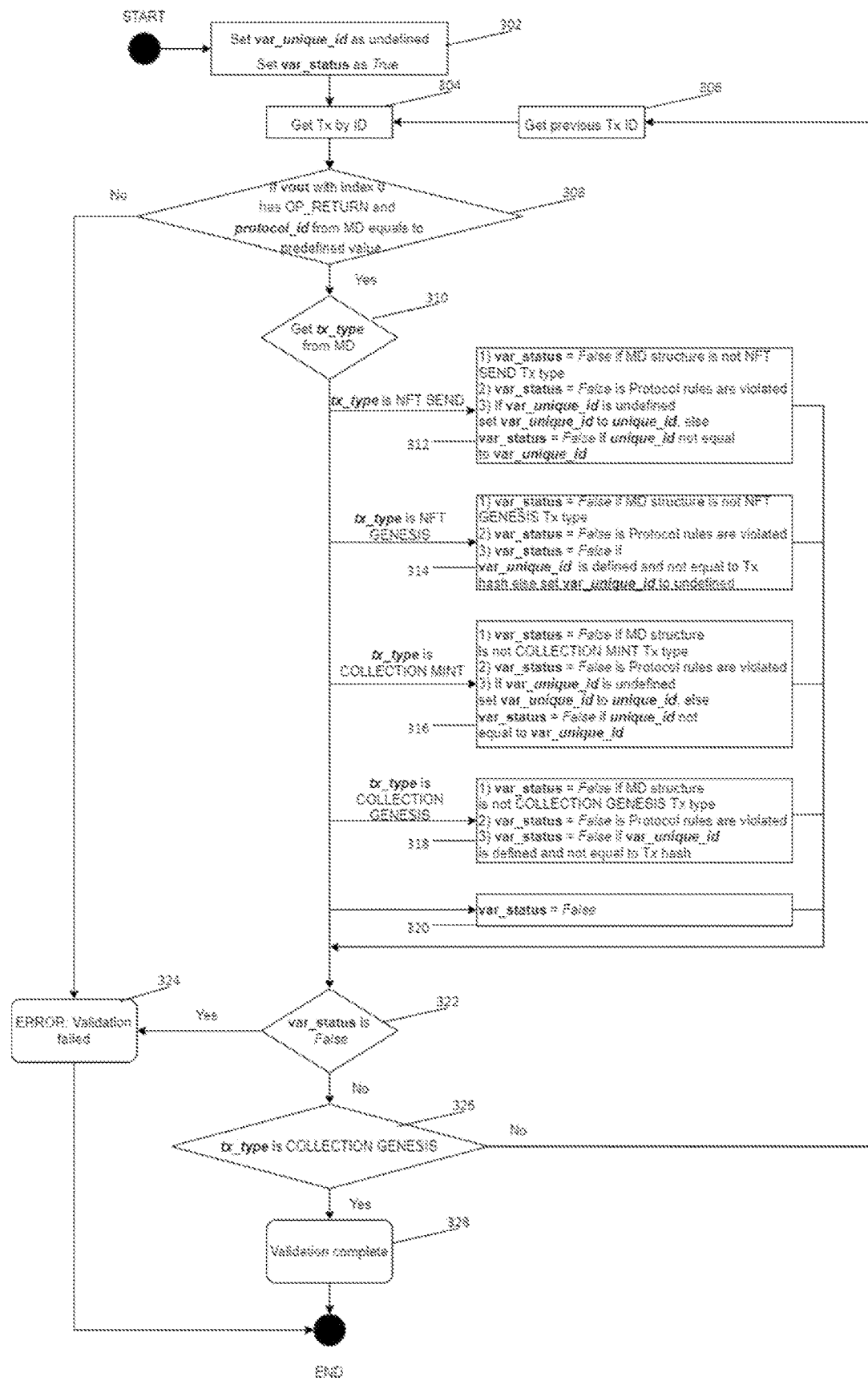

FIG. 3 explains the NFT transaction validation algorithm.

Figure 4:
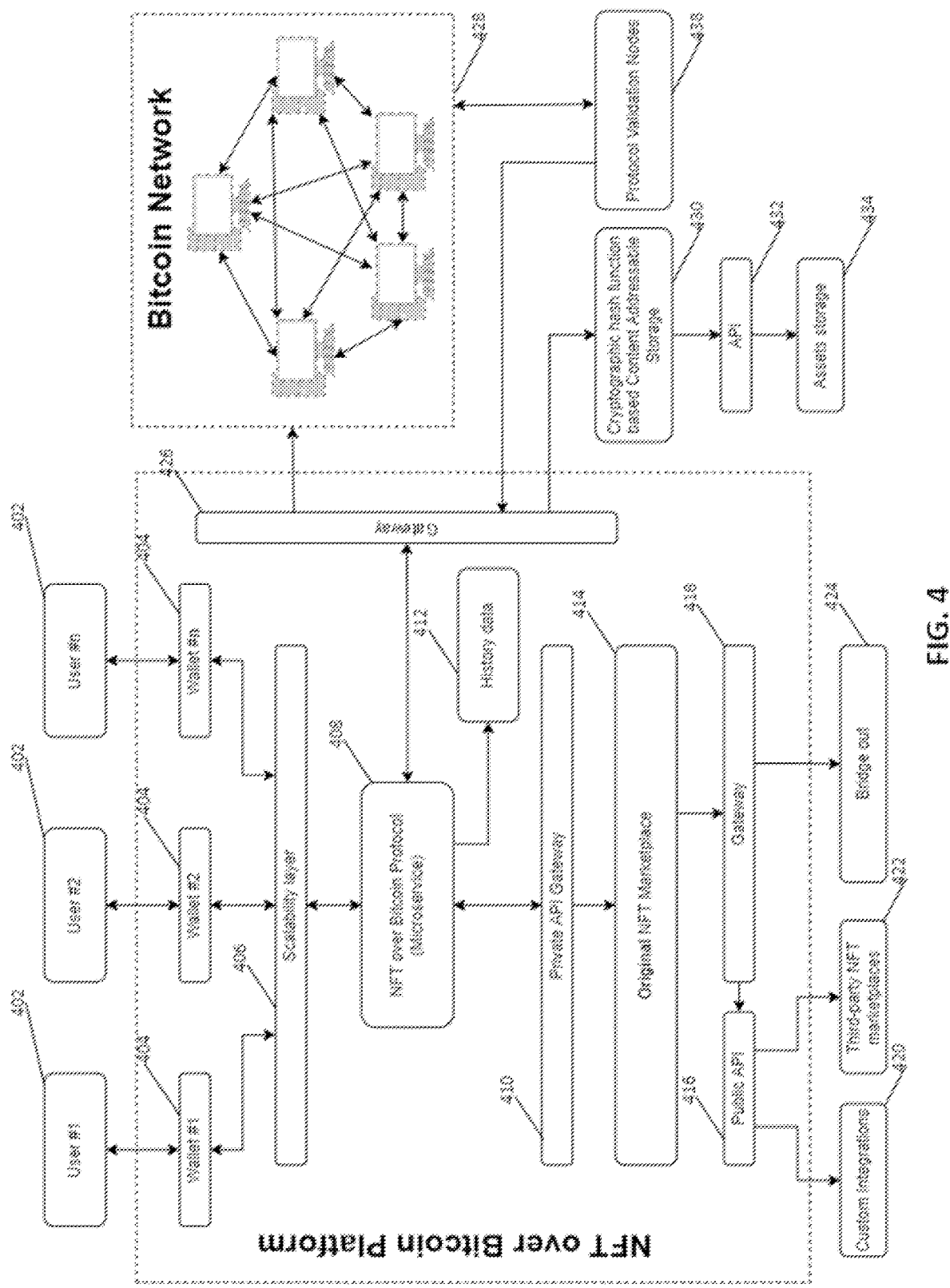

FIG. 4 illustrates system components used to generate NFTs with Bitcoin.

Figure 5:
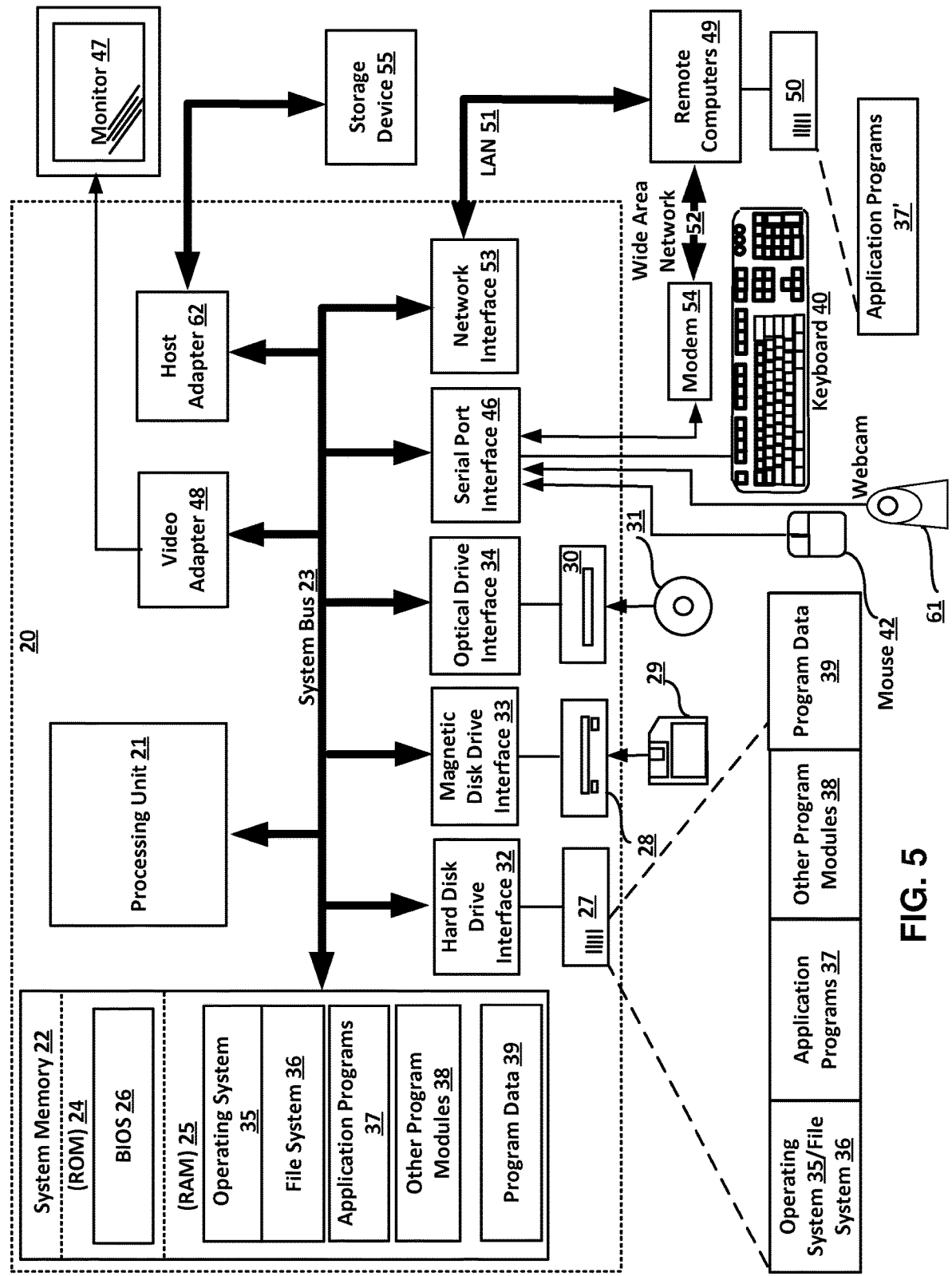

FIG. 5 illustrates a computer system or server on which the invention may be practiced.

DETAILED DESCRIPTION OF EMBODIMENTS OF THE INVENTION

Reference will now be made in detail to the preferred embodiments of the present invention, examples of which are illustrated in the accompanying drawings.

Because the proposed NFT protocol uses transaction chain of the existing Bitcoin framework, there are considerable limitations from the Bitcoin itself:

The amount of metadata contained by OP_RETURN opcode must not exceed 80 Bytes—

The Bitcoin network rejects any transaction with a dust amount of Satoshi [5]

The first limitation does not allow to store plain link to a web resource in OP_RETURN metadata. Hence, instead of direct links, it is proposed to store assets for NFT in CAS, e.g., IPFS [6], where address is represented by a hash value.

Considering the second limitation, minimal amount of Satoshi in UTXO attached to an NFT must be greater than computing power or fee that is required to validate the transaction by Bitcoin network.

To make proposed solution more like ERC-71, the protocol allows a number of NFTs to be grouped into NFT Collection with a single ID assigned.

The protocol defines the following types of PRTX, which are contained within the OP_RETURN metadata of standard Bitcoin transaction:
GENESIS COLLECTION—NFTs Collection issuing.
COLLECTION MINT—generates UTXOs for further NFT holding (one UTXO for NFT).
GENESIS NFT—NFT issuing.
NFT SEND—allows users to sell NFTs.

In addition, OP_RETURN metadata structure for each mentioned type of PRTX is defined by the protocol.

Considering that standard Bitcoin transaction can have multiple inputs and outputs, the protocol defines which one of them is to be associated with OP_RETURN metadata.

Finally, the protocol defines consensus rules that determine the validity of NFT issuing and NFT send transaction.

Protocol Related Transactions Overview

This section describes: PRTX structure, NFT issuing, OP_RETURN metadata that is used to encode required information, such as CAS address of NFT collection or NFT asset itself, protocol version, NFT collection size, etc.

FIG. 4 illustrates system components used to generate NFTs with Bitcoin. In FIG. 4, User #1 . . . n (402) is an individual that has an account with the system and has successfully passed onboarding procedure, e.g., account registration, KYC procedure, key pairs generation and registration, etc. Wallet #1 . . . n (404) is a custodial wallet created in the system, designed to issue/hold/sell NFTs to be managed in accordance with NFT over Bitcoin protocol (408, see FIG. 1 for details), and cryptocurrency coins in Bitcoin or other connected blockchain networks.

Scalability layer 406 is a server-side infrastructure of micro services to start, maintain, close secure session for each user connecting to the platform. Private API Gateway (410) is a server-side application providing a secure interface for communication among platform modules and applications. History Data (412) is a software module for retrieval and preparation of the data related to the operations with the specific NFT since its minting. Original NFT Marketplace (414) is a core application of the NFT marketplace, that contain all business logic to handle entire life cycle of the NFT collection and respective tokens. This application can have a user facing applications for users and platform administrators.

Public API (416) is a server-side application providing a communication interface for the third-party services, that need to request and collect the platform data, or integrate with the platform. Gateway (418) is a server-side application providing secure interfacing via dedicated adapters for communication between external (third-party) application and the platform. Custom Integrations (420) is a third-party application of any kind or functionality, that are using platform Public API (416) for their business purposes. Communications of this custom integrations can be one-way or two-way, and are regulated by the service level model. Third-party NFT marketplaces (422) are connected to the Original NFT Marketplace (414) core to utilize NFT over Bitcoin Protocol (408) via secure Gateway (418) in accordance to service level model. Element 408 is typically a server (physical or virtual) or a group of servers (physical or virtual) or a distributed system implemented on multiple physical machines, running a program that implements the NFT over Bitcoin protocol.

Bridge out (424) is a server-side software module that allows connection of blockchain networks other than Bitcoin and utilization of their native tokens for operation with the NFT on the platform. Gateway (426) is a server-side application providing secure interfacing with Bitcoin Network (428) to run transactions approved by Protocol Validation Nodes (438) maintaining Cryptographic hash function (430) for asset addresses in Assets Storage (434) (such as SHA-1, SHA-256, SHA-512, functions, etc.). Bitcoin Network (428) is a peer-to-peer network based on cryptographic protocol, enabling users to perform transactions of network specific cryptocurrency—Bitcoin.

Cryptographic hash function based CAS (430) is a designated module to store an asset for NFT (434) which uses a cryptographic hash function to generate an immutable link to the asset, e.g., IPFS. API (432) are third-party applications providing communication interfaces to operate Assets storage (434). Assets storage (434) is a plethora of various infrastructures capable to store reliably various types of digital media accepted as assets by the platform. Protocol Validation Nodes (438) is a dedicated network instance, whose sole function is to concurrently validate the transaction attempted to be performed in the network in exchange for the reward issued by the network for every successful transaction validation.

NFTs Issuing Flow

Figure 1:
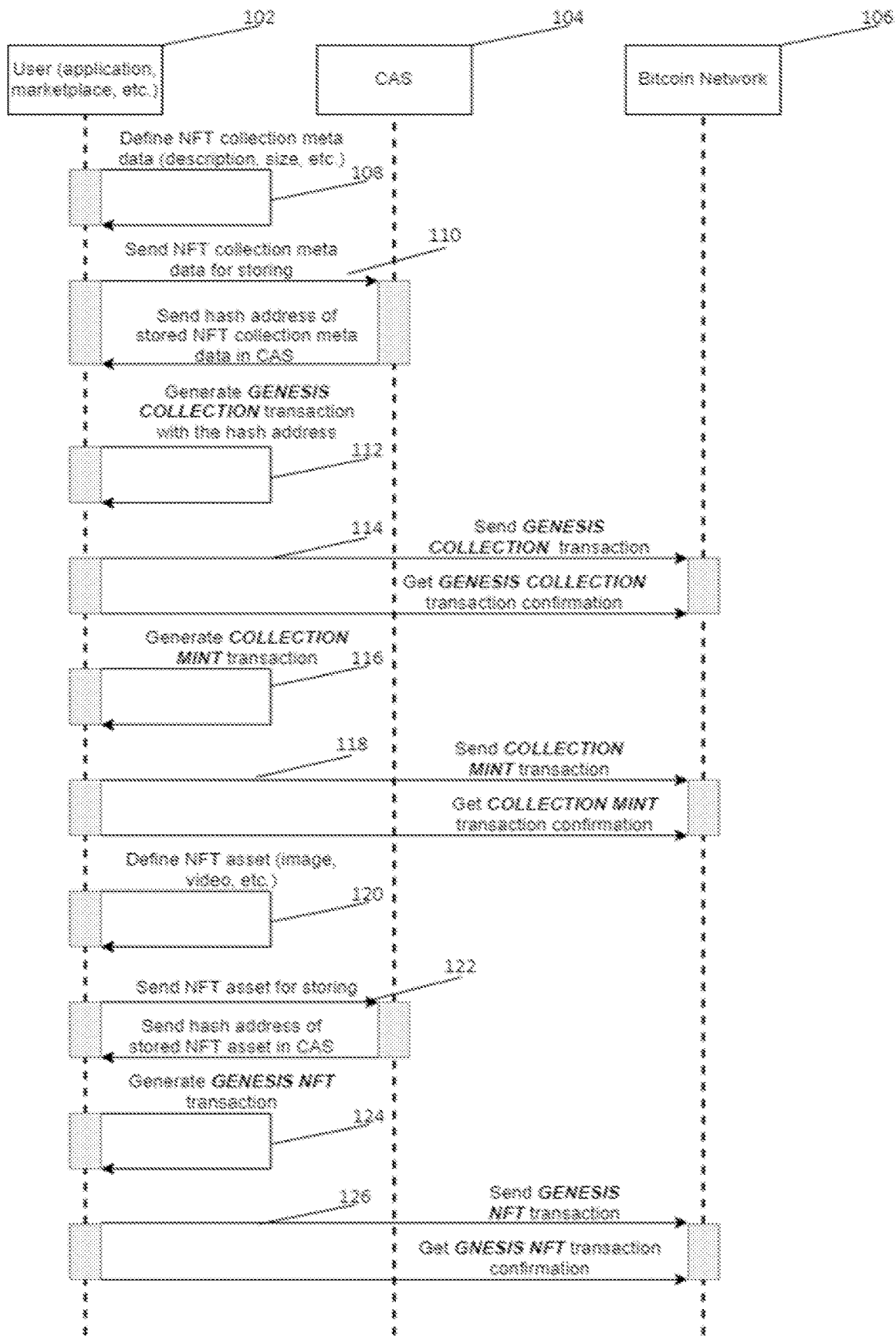
FIG. 1 illustrates NFT issuing flow and Bitcoin transactions.

To create a collection of NFTs and related NFTs, a user should perform the following steps, illustrated in FIG. 1, which illustrates NFT issuing flow and Bitcoin transactions:

To create a collection of NFTs and related NFTs, a user 102 should perform the following steps during communication with CAS system 104 and Bitcoin Network 106, illustrated in FIG. 1:

(1) A user 102 defines collection metadata 108 (description, image, number of NFTs in the collection, etc.).

(2) A user 102 sends request to CAS system 104 to store the collection metadata 108. A user 102 should receive the hash address from CAS system 104 as the result at the end of the step 110.

(3) A user 102 and forms GENESIS COLLECTION transaction 112 with the NFTs collection hash address received in step 110 and defined in number of NFTs in the collection metadata 108.

(4) In step 114 a user 102 should send GENESIS COLLECTION transaction 112 to Bitcoin Network 106 for storing in Bitcoin blockchain and getting GENESIS COLLECTION transaction 112 confirmation from Bitcoin Network 106.

(5) A user 102 forms COLLECTION MINT transaction 116 to generate UTXOs for further NFT holding using UTXO from GENESIS COLLECTION transaction 112 added to Bitcoin Network 106 in step 114. Note, that it is not necessary to generate all UTXOs at once, a user can specify in OP_RETURN metadata number of generated UTXOs using NFT issued quantity field.

(6) In step 118 a user 102 should send generated COLLECTION MINT transaction 116 to Bitcoin Network 106 for storing in Bitcoin blockchain and get COLLECTION MINT transaction 116 confirmation from Bitcoin Network 106.

(7) A user 102 defines a digital asset for an NFT 120 (image, video, etc.).

(8) A user 102 sends request to CAS system 104 to store the digital asset 120. A user 102 should receive the address from CAS system 104 as a result at the end of step 122.

(9) A user 102 forms GENESIS NFT transaction 124 with the NFT hash address received in step 122 using unspent UTXO from COLLECTION MINT transaction 116 added to the Bitcoin Network 106 in step 118.

(10) In step 126 a user 102 should send the generated GENESIS NFT transaction 124 to the Bitcoin Network 106 for storing in Bitcoin blockchain and get GENESIS NFT transaction 124 confirmation from the Bitcoin Network 106.

The transaction generated at the final step 126 is considered as issued NFT from a specified collection added to the Bitcoin blockchain in step 114.

Figure 2:
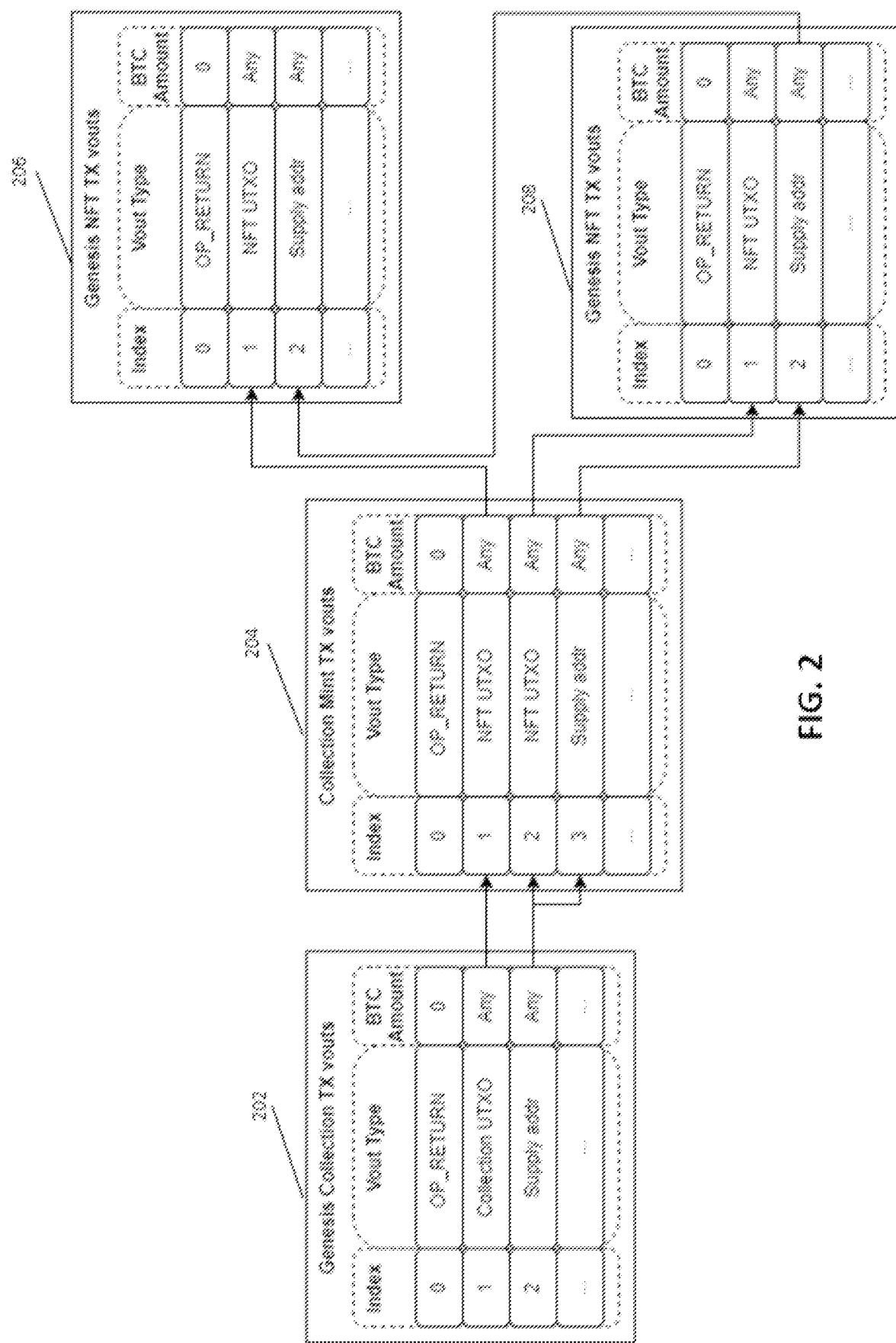
FIG. 2 shows transactions sequence and structure generated during Collection with two NFTs issuing.

FIG. 2 shows transactions sequence and structure generated during Collection with two NFTs issuing as a result of the process (each transaction is placed into a separate block). Note that in FIG. 2:

(1) Arrows show which transaction $V_{out}$ is used as input for further transaction;

(2) "Supply_addr"—is an address used for paying fee to create transaction and create UTXO associated with OP_RETURN $V_{out}$;

(3) "Any" means that there are identifiable restrictions to a value from the NFT protocol perspective.

202 shows a structure of a GENESIS COLLECTION transaction outputs. The output with index 0 contains OP_RETURN opcode with metadata corresponding to GENESIS COLLECTION transaction type. The output with index 1 is a bounded UTXO with the OP_RETURN metadata from the protocol perspective. The output with index 2 contains remaining Bitcoins balance of the "Supply_addr" after the transaction is added to the Bitcoin network. Other outputs can be any and are not processed by the protocol.

204 shows the structure of GENESIS MINT transaction outputs. The output with index 0 contains OP_RETURN opcode with metadata corresponding to GENESIS MINT transaction type. The outputs with indices 1 and 2 are bounded UTXOs with the OP_RETURN metadata from the protocol perspective, which are going to be used for further NFT holding. Note that UTXO with index 1 from 202 must be spent for the transaction generation. The output with index 3 contains the remaining Bitcoins balance of the "Supply_addr" after the transaction is added to the Bitcoin network. Other outputs can be any and are not processed by the protocol.

206 and 208 show the structure of GENESIS NFT transaction outputs. The output with index 0 contains OP_RETURN opcode with metadata corresponding to GENESIS NFT transaction type. The outputs with index 1 is bounded UTXOs with the OP_RETURN metadata from the protocol perspective. Note that for generating the GENESIS NFT transaction, one of the UTXOs from 204 with index 1 or 2 must be spent, in this example, the UTXO from 204 with index 1 is spent to generate 206, and UTXO from 204 with index 2 is spent to generate 208. The output with index 3 contains the remaining Bitcoins balance of the "Supply_addr" after the transaction is added to the Bitcoin network. Other outputs can be any and are not processed by the protocol.

Genesis Collection Transaction Type

This type of transaction is used for NFTs collection issuing, which can be uniquely identified by the transaction hash which is referred to the protocol as unique id. Note that size of each GENESIS COLLECTION OP_RETURN metadata field and valid values depend on the protocol implementation but total size of the metadata must not exceeds 80 bytes to satisfy Bitcoin requirements. Proposed below GENESIS COLLECTION OP_RETURN metadata structure contains minimal required fields for the protocol implementation, the metadata can be extended by any other field with changing protocol version (stored in the metadata), which provides backward compatibility. GENESIS COLLECTION metadata has the following structure shown in Table 1.

TABLE 1

GENESIS COLLECTION OP_RETURN Metadata

| Metadata Fields | Notes |
| --- | --- |
| protocol_id | ASCII encoded constant string, which is used for fast recognizing PRTX among all other Bitcoin transactions |
| protocol_v | Version of the protocol |
| tx_type | Contains value corresponding to GENESIS COLLECTION type |
| cas_hash_addr | CAS hash address of the NFTs collection metadata |
| nft_quantity | Number of NFTs in the collection |

There are no specific requirements (number, order, etc.) for transaction inputs. The transaction is self-evident from validation point of view. Transaction outputs should satisfy the following structure shown in Table 2:

TABLE 2

COLLECTION GENESIS Transaction Outputs

| $V_{out}$ index | scriptPubKey (BTC Address) | BTC Amount |
| --- | --- | --- |
| 0 | OP_RETURN with GENESIS COLLECTION metadata | 0 |
| 1 | Initial Collection Receiver | Any (>0) |
| 2 | Any | Any |
| ... | ... | ... |

Collection Mint Transaction type

Size of each COLLECTION MINT OP_RETURN metadata field and valid values depend on the protocol implementation but total size of the metadata must not exceeds 80 bytes to satisfy Bitcoin requirements. Proposed below COLLECTION MINT OP_RETURN metadata structure contains minimal required fields for the protocol implementation, the metadata can be extended by any other field with changing protocol version (stored in the metadata), which provides backward compatibility. COLLECTION MINT OP_RETURN metadata has the following structure shown in Table 3:

TABLE 3

COLLECTION MINT OP_RETURN Metadata

| Metadata Fields | Notes |
| --- | --- |
| protocol_id | ASCII encoded constant string, which is used for fast recognizing PRTX among all other Bitcoin transactions |
| protocol_v | Version of the protocol |
| tx_type | Contains value corresponds to COLLECTION MINT type |
| unique_id | Collection unique identifier (GENESIS COLLECTION transaction hash) |

TABLE 3-continued

COLLECTION MINT OP_RETURN Metadata

| Metadata Fields | Notes |
|---|---|
| utxo_issued_quantity | Number of UTXOs issued in current transaction |
| utxo_rest_quantity | The rest number of UTXOs to be issued |

From the protocol perspective, only one input must be associated with valid OP_RETURN metadata, the rest inputs can be any. Transaction outputs has the following structure shown in Table 4:

TABLE 4

COLLECTION MINT Outputs Structure

| $V_{out}$ index | scriptPubKey (BTC Address) | BTC Amount |
|---|---|---|
| 0 | OP_RETURN with COLLECTION MINT metadata | 0 |
| 1 | Receiver 1 | Any (>0) |
| 2 | Receiver 2 | Any (>0) |
| ... | ... | ... |
| N | Receiver N | Any (>0) |
| N + 1 | Initial Collection Receiver (optional) | Any (>0) |
| N + 2 | Any | Any |
| ... | ... | ... |

NFT Genesis Transaction Type

Size of each NFT GENESIS OP_RETURN metadata field and valid values depend on the protocol implementation, but total size of the metadata must not exceed 80 bytes to satisfy Bitcoin requirements. The NFT GENESIS OP_RETURN metadata structure proposed below contains minimal required fields for the protocol implementation, and the metadata can be extended by any other field with changing protocol version (stored in the metadata), which provides backward compatibility. NFT GENESIS OP_RETURN metadata is very close to COLLECTION GENESIS metadata (see Table 1), except for two items:

(1) Field tx_type has its own value, to identify the NFT GENESIS type.

(2) Field nft_quantity is removed for transaction size decrease, because NFT is a unique object by its nature.

In contrast with COLLECTION GENESIS, NFT GENESIS transaction must have one input with a valid UTXO associated with correct GENESIS MINT metadata.

NFT Send Transaction type

The size of each NFT SEND OP_RETURN metadata field and valid values depend on the protocol implementation but total size of the metadata must not exceeds 80 bytes to satisfy Bitcoin requirements. Proposed below NFT SEND OP_RETURN metadata structure contains minimal required fields for the protocol implementation, the metadata can be extended by any other field with changing protocol version (stored in the metadata), which provides backward compatibility. NFT SEND OP_RETURN metadata has the following structure shown in Table 5:

TABLE 5

NFT SEND OP_RETURN Metadata

| Metadata Fields | Notes |
|---|---|
| protocol_id | ASCII encoded constant string, which is used for fast recognizing PRTX among all other Bitcoin transactions |
| protocol_v | Version of the protocol |
| tx_type | Contains value corresponds to NFT SEND type |
| unique_id | NFT unique identifier (NFT GENESIS transaction hash) |

NFT SEND transaction must have one input with valid UTXO associated with correct NFT SEND metadata, exception is the first send operation where the input is valid UTXO associated with correct NFT GENESIS metadata. Transaction outputs are shown in Table 6:

TABLE 6

NFT SEND Outputs Structure

| $V_{out}$ index | scriptPubKey (BTC Address) | BTC Amount |
|---|---|---|
| 0 | OP_RETURN with NFT Send metadata | 0 |
| 1 | NFT new receiver | Any (>0) |
| 2 | Any | Any |
| ... | ... | ... |

IPFS Address storing in OP_RETURN metadata

As noted above, a field of metadata followed by OP_RETURN opcode can be extended to satisfy the protocol implementation limitations. For example, in case of IPFS use as CAS to store an NFT asset, where IPFS address has a more complicated structure compared to a simple cryptographic hash function value. To provide an address to an asset in IPFS, a content identifier, or CID [9] is used, which is based on a cryptographic hash. There are two forms of CID versions:

CID v0-base 58-encoded multi-hashes [10] as the content identifier.

CID v1-contains leading identifiers that clarify exactly which representation is used along with the content hash itself.

The first few bytes of the CID define how to interpret the remaining bytes. If the CID starts with "Qm" it should be considered as CID v0 and the rest is base58btc encoded, given CID is v1 vice versa. The first symbol in a given CID v1 defines encoding scheme, see [12]. More details of the CID decoding algorithm is available in [13] After decoding, the CID has one of the following structures shown in Table 7 and Table 8 (see multi-codec table [13] for more details of opcode values):

TABLE 7

CID v0 Structure

| Field | Visibility | Opcode Value |
|---|---|---|
| cid-version | implicit | always cidv0 |
| content-type | implicit | always dag-pd |
| hash function code | explicit | always sha2-256 |
| digest size in bytes | explicit | always equals 0x20 |
| hash digest | explicit | ... |

TABLE 8

CID v1 Structure

| Field | Visibility | Opcode Value |
|---|---|---|
| cid-version | explicit | cidv1, cidv2, etc. |
| content-type | explicit | any according to opcode table (required ≤2 bytes) |
| hash function code | explicit | any according to opcode table |
| digest size in bytes | explicit | depends on the hash function |
| hash digest | explicit | ... |

It follows from the above CIDs formats and from the best practices of uploading NFT data to IPFS [14], that it is not necessary to store the whole CID in OP_RETURN metadata. For example, a field related to hash function digest size can be omitted, and successfully, restored later using hash function code from multicodec table [13]. Thus, the cas_hash_addr field in PRTX described above can be replaced with a set of fields to store IPFS address in OP_RETURN metadata, see Table 9:

TABLE 9

IPFS address storing

| Field | Size (Bytes) | Notes |
|---|---|---|
| cid_version | 1 | CID version |
| content_type | 2 | Content type (code from multicode table extended up to 2 bytes) |
| hash_function | 4 | Hash function (code from multicode table extended up to 4 bytes) |
| hash_digest | Defined by used hash function | Output of a hash function |

EXAMPLES

This section contains examples of PRTXs, which represent NFT issuing flow.

Collection issuing: Bitcoin testnet link

TABLE 10

Decoded COLLECTION GENESIS Metadata

| HEX value | Size (Bytes) | Meaning |
|---|---|---|
| 50504e4654 | 5 | ASCII encoded constant string "PPNFT" |
| 01 | 1 | Protocol version is 1 |
| 01 | 1 | COLLECTION GENESIS transaction type |
| 01 | 1 | CID version is 1 (corresponds to 0x01 opcode from multicode table) |
| 0007 | 2 | Content type is dag-pd (corresponds to 0x07 opcode from multicode table) |
| 00000012 | 4 | Hash function is sha2-256 (corresponds to 0x12 opcode from multicode table) |
| c5181aa0 ... 19764d88 | 32 | Hash value in IPFS address of the collection |
| 0003 | 2 | Total number of NFTs in the collection equals 3 |

Collection minting: Bitcoin testnet link

TABLE 11

GENESIS MINT Decoded Metadata

| HEX value | Size (Bytes) | Meaning |
|---|---|---|
| 50504e4654 | 5 | ASCII encoded constant string "PPNFT" |
| 01 | 1 | Protocol version is 1 |
| 02 | 1 | COLLECTION MINT transaction type |
| b0cf954b ... 9bd911d0 | 32 | Collection unique ID (hash of the COLLECTION GENESIS transaction) |
| 0002 | 2 | Two UTXOs has been created in the transaction |
| 0001 | 2 | One UTXO can be issued further |

NFT issuing: Bitcoin testnet link

TABLE 12

Decoded NFT GENESIS Metadata

| HEX value | Size (Bytes) | Meaning |
|---|---|---|
| 50504e4654 | 5 | ASCII encoded constant string "PPNFT" |
| 01 | 1 | Protocol version is 1 |
| 03 | 1 | NTF GENESIS transaction type |
| 01 | 1 | CID version is 1 (corresponds to 0x01 opcode from multicode table) |
| 0007 | 2 | Content type is dag-pd (corresponds to 0x07 opcode from multicode table) |
| 00000012 | 4 | Hash function is sha2-256 (corresponds to 0x12 opcode from multicode table) |
| 1603f57f ... ac922db7 | 32 | Hash value in IPFS address of the NFT asset |

NFT sending to a new owner: Bitcoin testnet link

TABLE 13

Decoded NFT SEND Metadata

| HEX value | Size (Bytes) | Meaning |
|---|---|---|
| 50504e4654 | 5 | ASCII encoded constant string "PPNFT" |
| 01 | 1 | Protocol version is 1 |
| 04 | 1 | NTF SEND transaction type |
| 23958d61 ... 92ae44eb | 32 | NFT unique ID (hash of the NFT GENESIS transaction) |

Protocol Rules

This section describes the set of rules to validate an NFT transaction. With this set, anyone can verify UTXO associated with OP_RETURN metadata from the current transaction moving back up to COLLECTION GENESIS.

To be recognized as valid transaction, current and all previous transactions up to COLLECTION GENESIS must satisfy the following rules:

(1) The first transaction output must contain OP_RETURN opcode.

(2) Metadata after OP_RETURN from the first transaction output (denoted as NFT metadata) must have a structure corresponding to metadata structure of one of PRTX transactions;

(3) At least one UTXO must follow after NFT metadata. The UTXO is considered to be associated with NFT metadata. The exact number of associated UTXOs depends on PRTX type and metadata itself.

(4) COLLECTION GENESIS, NFT GENESIS and NFT SEND has only one UTXO to be considered by the protocol as associated with NFT metadata.

(5) COLLECTION MINT allows generation only part (less than mentioned collection size) of UTXOs per transaction, hence the number of associated UTXOs may vary, but must satisfy the following rules:

if utxo_rest quantity equals 0 in NFT metadata, then number of associated UTXOs is equal to utxo issue quantity from the NFT metadata, and utxo issued quantity+1 vice versa.

total number of UTXOs used for further NFT holding among all COLLECTION MINT transactions related to the current collection must not exceed utxo issued quantity.

if utxo rest quantity is not equal 0, one associated UTXO must be used for further UTXOs generation via COLLECTION MINT transaction type.

Only first (by order and time) NFT quantity (specified in COLLECTION GENESIS metadata) UTXOs for NFT holding are recognized by the protocol, the rest are simply ignored.

(6) Any other outputs with OP_RETURN are acceptable but must be placed after UTXOs associated with NFT metadata, such outputs are ignored by the protocol.

(7) All NFT related transaction must have only one UTXO with valid OP_RETURN metadata as input, exception is COLLECTION GENESIS.

The diagram of FIG. 3 explains the NFT transaction validation algorithm. The algorithm moves back starting from given transaction ID up to COLLECTION GENESIS transaction, for each transaction the algorithm checks a set of protocol rules from above (depends on PRTX type) and metadata (MD) structure. The algorithm uses two internal variables. The input for the algorithm is a Bitcoin transaction ID. Without limiting generality, and to make the explanation simple, assume that UTXO bounded with OP_RETURN opcode with corresponding to the protocol metadata has index 0 among all transaction inputs.

As shown in FIG. 3, after START, in step 302, the system allocates memory for two internal variables var_unique_id and var_status. Where var_unique_id is used for NFT or collection of NFTs identifier from previous valid PRTX, and boolean variable var_status is used for storing of current status of PRTX sequence validation. Initial value of var_status should be equals True.

In step 304, the system requests transaction with corresponding ID from Bitcoin network.

In step 308, the system should check that the first vout of the current transaction has OP_RETURN opcode and protocol_id field in metadata followed by OP_RETURN opcode equals to predefined value. The step allows to simplify PRTX filtering among all other Bitcoin transactions. If both conditions are satisfied the system goes to the next step 310, and step 324 in vice versa.

In step 310, the system reads PRTX type, which is defined by a value of tx_type field in metadata followed by OP_RETURN opcode. Further validation process is specific for each PRTX type, so the next step is defined by the value of tx_type.

The system reaches step 312, if value of tx_type has a value corresponding to NFT SEND transaction. So, the system should check that metadata structure followed by OP_RETURN opcode corresponds to NFT SEND metadata structure, and there are no violation of the protocol requirements. Additionally, if value of variable var_unique_id is defined, then the value must be equal to the value of unique_id field from metadata. If value of variable var_unique_id is undefined, it should be initialised with current value of unique_id field from metadata. If all requirements are satisfied the system set var_status variable to True, and to False in vice versa. In the end of the step the system goes to the step 322.

The system reaches step 314, if value of tx_type has a value corresponding to NFT GENESIS transaction. So, the system should check that metadata structure followed by OP_RETURN opcode corresponds to NFT GENESIS metadata structure, and there are no violation of the protocol requirements. Also, if value of variable var_unique_id is defined, then the value must be equal to the value of unique_id field from metadata. If all requirements are satisfied the system set var_status variable to True, and to False in vice versa. In the end of the step the system reset the value of var_unique_id variable and goes to the step 322.

The system reaches step 316, if value of tx_type has a value corresponding to COLLECTION MINT transaction. So, the system should check that metadata structure followed by OP_RETURN opcode corresponds to COLLECTION MINT metadata structure, and there are no violation of the protocol requirements. Additionally, if value of variable var_unique_id is defined, then the value must be equal to the value of unique_id field from metadata. If value of variable var_unique_id is undefined, it should be initialised with current value of unique_id field from metadata. If all requirements are satisfied the system set var_status variable to True, and to False in vice versa. In the end of the step the system goes to the step 322.

The system reaches step 318, if value of tx_type has a value corresponding to COLLECTION GENESIS transaction. So, the system should check that metadata structure followed by OP_RETURN opcode corresponds to COLLECTION GENESIS metadata structure, and there are no violation of the protocol requirements. Additionally, if value of variable var_unique_id is defined, then the value must be equal to the value of unique_id field from meta data. If value of variable var_unique_id is undefined. If all requirements are satisfied the system set var_status variable to True, and to False in vice versa. In the end of the step the system goes to the step 322.

System reaches step 320, if value of tx_type equals to any other value, which means that current transaction can not be recognised by the protocol, so the system set var_status to False and goes to the step 322.

In step 322, the system reads var_status variable and based on its value choses the next step. If var_status equals False the next step is 324, and 326 vice versa.

In step 326, the system should choose between step 306 or step 326, based on current value of tx_type variable. If current tx_type has value corresponding to COLLECTION GENESIS than the whole sequence of NFT related transaction starting from transaction with input ID has been validated and the system goes to step 326. If current transaction has other type then the sequence has not been completely validated and the system goes to step 306.

In step 306, the system receives previous transaction ID from the first input used to generate the current transaction.

Step 328 means that NFT related transaction sequence starting from transaction with input
ID is valid, the validation process is finished.

Step 324 means that NFT related transaction sequence starting from transaction with input
ID is invalid, the validation process is finished.

UTXOs Associated With NFT Spending Rules

It follows from above that an NFT has an associated UTXO, which is used to transfer NFT between addresses. If the UTXO is spent with violation of the protocol rules, then the NFT is lost without the possibility to restore it whatsoever. At the same time, the third-party wallets can spend UTXOs with an NFT by accident, if the wallet knows transaction condition spending, e.g., an UTXO with NFT is locked by P2PKH [7] and the corresponding secret key is available for the wallet.

To avoid burning NFTs by accident, P2SH [8] with standardized redeem script can be used as payment method for NFTs transfer and issuing. In this case, even if third-party wallet knows keys used in redeem script, such UTXO is recognized as unsolvable by a wallet, because redeem script is unknown to a wallet. Moreover, Bitcoin environment provides different ways of safety spending UTXOs associated with NFT, each way has its own pros and cons and can be selected depends on user requirement, for example:

(1) P2SH with redeem P2PKH script—has lower transaction fee, but strictly limits spending condition.

(2) Taproot [15]—has higher transaction fee (comparing with P2PKH wrapped by P2SH), but allows users buy a high price NFT as a group of people and sell it late according to predefined scenarios.

With reference to FIG. 5, an exemplary system for implementing the invention includes a general purpose computing device in the form of a host computer or a server 20 or the like, including a processing unit (CPU) 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes a read-only memory (ROM) 24 and random access memory (RAM) 25. A basic input/output system 26 (BIOS), containing the basic routines that help to transfer information between the elements within the computer 20, such as during start-up, is stored in ROM 24.

The computer or server 20 may further include a hard disk drive 27 for reading from and writing to a hard disk, not shown herein, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the server 20. Although the exemplary environment described herein employs a hard disk (storage device 55), a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk (storage device 55), magnetic disk 29, optical disk 31, ROM 24 or RAM 25, including an operating system 35 (e.g., MICROSOFT WINDOWS, LINUX, APPLE OS X or similar) The server/computer 20 includes a file system 36 associated with or included within the operating system 35, such as the Windows NT™ File System (NTFS) or similar, one or more application programs 37, other program modules 38 and program data 39. A user may enter commands and information into the server 20 through input devices such as a keyboard 40, a webcam 61 and pointing device (e.g., a mouse) 42.

Other input devices (not shown) may include a microphone, joystick, game pad, satellite dish, scanner or the like. These and other input devices are often connected to the processing unit 21 through a serial port interface 46 that is coupled to the system bus, and they may also be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers. A host adapter 62 is used to connect to the storage device 55.

The server/computer 20 may operate in a networked environment using logical connections to one or more remote computers 49. The remote computer (or computers) 49 may be another personal computer, a server, a router, a network PC, a peer device or other common network node, and it typically includes some or all of the elements described above relative to the server 20, although here only a memory storage device 50 with application software 37' is illustrated. The logical connections include a local area network (LAN) 51 and a wide area network (WAN) 52. Such networking environments are common in offices, enterprise-wide computer networks, Intranets and the Internet.

In a LAN environment, the server/computer 20 is connected to the local network 51 through a network interface or adapter 53. When used in a WAN networking environment, the server 20 typically includes a modem 54 or other means for establishing communications over the wide area network 52, such as the Internet.

The modem 54, which may be internal or external, is connected to the system bus 23 via the serial port interface 46. In a networked environment, the program modules depicted relative to the computer or server 20, or portions thereof, may be stored in the remote memory storage device. It will be appreciated that the network connections shown are merely exemplary and other means of establishing a communications link between the computers may be used.

Having thus described a preferred embodiment, it should be apparent to those skilled in the art that certain advantages of the described method and system have been achieved.

It should also be appreciated that various modifications, adaptations, and alternative embodiments thereof may be made within the scope and spirit of the present invention. The invention is further defined by the following claims.

REFERENCES (ALL INCORPORATED HEREIN BY REFERENCE IN THEIR ENTIRETY)

1. ERC-721 Non-Fungible Token Standard: https*****eips.ethereum.org/EIPS/eip-721
2. BTC vs ETH transaction fee: https*****www.theblockcrypto.com/data/on-chain-metrics/comparison-bitcoin-ethereum/average-transaction-fee
3. Bitcoin Collored Coins: https*****en.bitcoinit/wiki/Colored_Coins
4. Bitcoin Script: https***en.bitcoin.it/wiki/Script 5. Bitcoin dust definition: https***www.investopedia.com/terms/b/bitcoin-dust.asp
6. IPFS: https*****docs.ipfs.io/concepts/7.
7. Pay-to-Pubkey Hash: https*****en.bitcoinwiki.org/wiki/Pay-to-Pubkey_flash
8. Pay-to-Script Hash: https*****en.bitcoinwiki.org/wiki/Pay-to-Script_Hash
9. IPFS CID: https*****docs.ipfs.io/concepts/content-addressing/#identifier-formats
10. IPFS Multihashes: https*****github.com/multiformats/multihash
11. IPFS Multibase: https*****github.com/multiformats/multibase
12. IPFS CID Decoding Algorithm: https*****github.com/multiformats/cid/blob/eflb2002394b15ble6c26c30545fd485f2c4c138/README.md#decoding-algorithm
13. IPFS Multicodec Table: https*****github.com/multiformats/multicodec/blob/master/table.csv
14. Best Practices for Storing NFT Data Using IPFS: https*****docs.ipfs.io/how-to/best-practices-for-nft-dataNtypes-of-ipfs-links-and-when-to-use-them
15. BitcoinTaproot: https*****academy.binance.com/en/articles/what-is-taproot-and-how-it-will-benefit-bitcoin
16. Bitcoin transactions: https*****developer.bitcoin.org/devguide/transactions.html
17. Content Addressable Storage: https*****en.wikipedia.org/wiki/Content-addressable_storage
18. Bitcoin transactions overview: https*****developer.bitcoin.org/devguide/transactions.html

What is claimed is:

1. A method of implementing Non-Fungible Tokens (NFTs) using Bitcoin, the method comprising:
creating a set of metadata describing a collection of NFTs;
loading the metadata into a Content Addressable Storage;
receiving a first cryptographic hash representing an address of the set of the metadata in the Content Addressable Storage;
generating a GENESIS COLLECTION transaction that includes the first cryptographic hash and a first UTXO, wherein the first UTXO is associated with metadata of the GENESIS COLLECTION,
wherein the GENESIS COLLECTION transaction is a Bitcoin transaction where a first output of the GENESIS COLLECTION transaction contains OP_RETURN opcode with metadata corresponding to GENESIS COLLECTION transaction type, a second output of the GENESIS COLLECTION transaction is a UTXO bounded with the OP_RETURN, and
wherein the metadata that follows the OP_RETURN opcode includes the first cryptographic hash, the number of digital assets in the collection;
sending the GENESIS COLLECTION transaction to a Bitcoin blockchain;
generating a COLLECTION MINT transaction that includes multiple UTXOs created using the first UTXO;
defining a digital asset to be associated with an NFT from the collection of NFTs;
loading the digital asset into the Content Addressable Storage;
receiving a second cryptographic hash representing an address of the digital asset in the Content Addressable Storage;
using one of the multiple UTXOs, generating a GENESIS NFT transaction that includes the second cryptographic hash and corresponding UTXO, and sending the GENESIS NFT transaction to the Bitcoin blockchain;
using the UTXO from the GENESIS NFT transaction to change owner of the NFT for the first time by generating a NFT SEND transaction with a corresponding UTXO, and sending the NFT SEND transaction to the Bitcoin blockchain; and
using the UTXO from the NFT SEND transaction to change the owner of the NFT by generating an NFT SEND transaction with a corresponding UTXO, and sending the NFT SEND transaction to the Bitcoin blockchain.

2. The method of claim 1, wherein the Content Addressable Storage is based on cryptographic hashes.

3. The method of claim 1, further comprising receiving confirmation from the Bitcoin blockchain that the GENESIS COLLECTION transaction was processed and added to the Bitcoin blockchain, after the generating a GENESIS COLLECTION transaction step.

4. The method of claim 1, further comprising receiving confirmation from the Bitcoin blockchain that the COLLECTION MINT transaction was processed and added to the Bitcoin blockchain, after the generating a COLLECTION MINT transaction step.

5. The method of claim 1, further comprising receiving confirmation from the Bitcoin blockchain that the GENESIS NFT transaction was processed and added to the Bitcoin blockchain, after the generating a GENESIS NFT transaction step.

6. The method of claim 1, wherein the GENESIS NFT transaction is a Bitcoin transaction where a first output of the GENESIS NFT transaction contains OP_RETURN opcode with metadata corresponding to GENESIS NFT transaction type, a second output of the GENESIS NFT transaction is a UTXO bounded with the OP_RETURN.

7. The method of claim 1, wherein the COLLECTION MINT transaction is a Bitcoin transaction where a first output of the COLLECTION MINT transaction contains OP_RETURN opcode with metadata corresponding to COLLECTION MINT transaction type, and UTXOs bounded with the OP_RETURN, wherein a number of bounded UTXOs is defined by a collection issuer, and stated in the OP_RETURN metadata, and does not exceed a collection size defined in GENESIS COLLECTION metadata.

8. The method of claim 1, wherein, the step of generating the COLLECTION MINT transaction includes validating the GENESIS COLLECTION transaction.

9. The method of claim 1, wherein the NFT SEND transaction is a Bitcoin transaction where a first output of the NFT SEND transaction contains OP_RETURN opcode with metadata corresponding to NFT SEND transaction type, the second output is UTXO bounded with the OP_RETURN.

10. The method of claim 1, wherein, the step of generating the NFT SEND transaction includes validating all previous transactions up to the GENESIS COLLECTION transaction.

11. The method of claim 1, wherein, the step of generating the GENESIS NFT transaction includes validating all previous transactions up to the GENESIS COLLECTION transaction.

12. The method of claim 6, wherein the metadata the metadata that follows the OP_RETURN opcode contains the second cryptographic hash, a predefined marker to identify such transactions among the rest Bitcoin transactions, and the second output is a standard Bitcoin output with a valid amount of Bitcoin cryptocurrency.

13. The method of claim 1, wherein the metadata that follows the OP_RETURN opcode includes a predefined marker to identify the GENESIS COLLECTION transaction among other Bitcoin transactions, and wherein the second output the GENESIS COLLECTION transaction is a standard Bitcoin output with a valid amount of Bitcoin cryptocurrency.

14. The method of claim 7, wherein the COLLECTION MINT transaction is a standard Bitcoin transaction with the following structure: the first output of the COLLECTION MINT transaction has an OP_RETURN Bitcoin script opcode and metadata, followed by a predefined marker to identify such transactions, a unique identifier of the collection, a number of outputs for further NFT binding in the current transaction and number of outputs to be issued further with another COLLECTION MINT transaction, and wherein the COLLECTION MINT transaction has standard Bitcoin outputs.

15. The method of claim 8, wherein the step of generating the COLLECTION MINT transaction includes validating the GENESIS COLLECTION transaction, which satisfies a definition of a COLLECTION GENESIS transaction type.

16. The method of claim 9, wherein the NFT SEND transaction has the first output with an OP_RETURN Bitcoin script opcode and metadata, followed by a predefined marker to identify such transactions among Bitcoin transactions, and a unique NFT GENESIS transaction hash, and wherein the second output of the NFT SEND transaction is a standard Bitcoin output with a valid amount of Bitcoin cryptocurrency.

17. The method of claim 10, wherein the step of generating the NFT SEND transaction includes validating all previous transactions up to the GENESIS COLLECTION transaction, and wherein each NFT SEND transaction must satisfy a definition of a corresponding transaction type out of NFT SEND, GENESIS NFT, COLLECTION MINT, and GENESIS COLLECTION transaction types.

18. The method of claim 11, wherein the step of generating the GENESIS NFT transaction includes validating all previous transactions up to the GENESIS COLLECTION transaction, wherein each GENESIS NFT transaction must satisfy a definition of a corresponding transaction type out of COLLECTION MINT and GENESIS COLLECTION types.

19. The method of claim 11, wherein an input for the COLLECTION MINT transaction is the second output of the GENESIS COLLECTION transaction or one additional output from a previous COLLECTION MINT transaction.

20. A system for implementing Non-Fungible Tokens (NFTs) using Bitcoin, the system comprising a server configured to perform the following:
creating a set of metadata describing a collection of NFTs;
loading the metadata into a Content Addressable Storage;
receiving a first cryptographic hash representing an address of the set of the metadata in the Content Addressable Storage;
generating a GENESIS COLLECTION transaction that includes the first cryptographic hash and a first unspendable transaction output (UTXO), wherein the first UTXO is associated with metadata of the GENESIS COLLECTION, and
wherein the GENESIS COLLECTION transaction is a Bitcoin transaction where a first output of the GENESIS COLLECTION transaction contains OP_RETURN opcode with metadata corresponding to GENESIS COLLECTION transaction type, a second output of the GENESIS COLLECTION transaction is a UTXO bounded with the OP_RETURN, and
wherein the metadata that follows the OP_RETURN opcode includes the first cryptographic hash, the number of digital assets in the collection;
sending the GENESIS COLLECTION transaction to a Bitcoin blockchain;
generating a COLLECTION MINT transaction that includes multiple unspendable transaction outputs (UTXOs) created using the first UTXO;
defining a digital asset to be associated with an NFT from the collection of NFTs;
loading the digital asset into the Content Addressable Storage;
receiving a second cryptographic hash representing an address of the digital asset in the Content Addressable Storage;
using one of the multiple unspendable transaction outputs (UTXOs), generating a GENESIS NFT transaction that includes the second cryptographic hash; and
sending the GENESIS NFT transaction to the Bitcoin blockchain.

21. A method of implementing Non-Fungible Tokens (NFTs) using Bitcoin, the method comprising:
creating a set of metadata describing a collection of NFTs;
loading the metadata into a Content Addressable Storage;
receiving a first cryptographic hash representing an address of the set of the metadata in the Content Addressable Storage;
generating a GENESIS COLLECTION transaction that includes the first cryptographic hash and a first UTXO, wherein the first UTXO is associated with metadata of the GENESIS COLLECTION;
sending the GENESIS COLLECTION transaction to a Bitcoin blockchain;
generating a COLLECTION MINT transaction that includes multiple UTXOs created using the first UTXO,
wherein the COLLECTION MINT transaction is a Bitcoin transaction where a first output of the COLLECTION MINT transaction contains OP_RETURN opcode with metadata corresponding to COLLECTION MINT transaction type, and UTXOs bounded with the OP_RETURN, wherein a number of bounded UTXOs is defined by a collection issuer, and stated in the OP_RETURN metadata, and does not exceed a collection size defined in GENESIS COLLECTION metadata;
defining a digital asset to be associated with an NFT from the collection of NFTs;
loading the digital asset into the Content Addressable Storage;
receiving a second cryptographic hash representing an address of the digital asset in the Content Addressable Storage;
using one of the multiple UTXOs, generating a GENESIS NFT transaction that includes the second cryptographic hash and corresponding UTXO, and sending the GENESIS NFT transaction to the Bitcoin blockchain;
using the UTXO from the GENESIS NFT transaction to change owner of the NFT for the first time by generating a NFT SEND transaction with a corresponding UTXO, and sending the NFT SEND transaction to the Bitcoin blockchain; and using the UTXO from the NFT SEND transaction to change the owner of the NFT by generating an NFT SEND transaction with a corresponding UTXO, and sending the NFT SEND transaction to the Bitcoin blockchain.

* * * * *